United States Patent
Maile

(10) Patent No.: US 7,500,909 B2
(45) Date of Patent: Mar. 10, 2009

(54) FILLING MACHINE AND METHOD OF FEEDING PASTE MASSES FROM A HOPPER INTO A CONVEYING MECHANISM

(75) Inventor: Bernd Maile, Oggelshausen (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 66 days.

(21) Appl. No.: 11/709,554

(22) Filed: Feb. 22, 2007

(65) Prior Publication Data
US 2007/0212994 A1    Sep. 13, 2007

(30) Foreign Application Priority Data
Mar. 2, 2006    (EP)    ............... 06004279

(51) Int. Cl.
*A22C 11/00*    (2006.01)

(52) U.S. Cl. ............................................. 452/41

(58) Field of Classification Search ............ 452/21–26, 452/30–37, 46–48, 51
See application file for complete search history.

(56) References Cited

U.S. PATENT DOCUMENTS

| | | | |
|---|---|---|---|
| 3,166,786 A | | 1/1965 | Thompson |
| 3,742,556 A | * | 7/1973 | Beasley ............... 452/41 |
| 4,427,040 A | | 1/1984 | Taylor |
| 4,787,826 A | | 11/1988 | Schnell |
| 5,097,876 A | * | 3/1992 | Lagares ............... 141/249 |
| 5,364,251 A | * | 11/1994 | Simonsen .............. 418/220 |
| 5,380,240 A | | 1/1995 | Staudenrausch et al. |
| 6,234,890 B1 | * | 5/2001 | Passoke et al. ........... 452/30 |
| 6,321,642 B1 | * | 11/2001 | Ou-Young .............. 99/494 |
| 6,767,277 B2 | * | 7/2004 | Henry et al. ............. 452/30 |
| 6,939,215 B2 | | 9/2005 | Schnell et al. |
| 7,381,122 B2 | * | 6/2008 | Lagares Corominas ...... 452/30 |

FOREIGN PATENT DOCUMENTS

| | | |
|---|---|---|
| DE | 459 031 | 9/1930 |
| DE | 42 27 621 A1 | 2/1994 |
| DE | 44 17 906 A1 | 11/1995 |
| EP | 0 198 300 A2 | 10/1986 |
| EP | 0 569 959 A1 | 11/1993 |
| EP | 1 040 758 A1 | 10/2000 |
| EP | 1 051 912 A1 | 11/2000 |
| EP | 1 502 509 A1 | 2/2005 |
| GB | 998572 | 7/1965 |
| GB | 1 380 082 A1 | 1/1975 |

\* cited by examiner

*Primary Examiner*—Thomas Price
(74) *Attorney, Agent, or Firm*—Marshall, Gerstein & Borun LLP

(57) ABSTRACT

A method and a filling machine for charging paste mass, in particular sausage meat, with a conveying mechanism 14 arranged at the lower end 3 of the hopper 1 and a feed device 4, 5 for feeding the paste mass from the hopper into the conveying mechanism. To facilitate the charging of the conveying mechanism from the hopper 1 continuously and completely with paste mass, and namely independent of the degree of evacuation and the filling level of the paste mass, the feed device comprises a combination of a feeder curve 4 and a screw conveyor 5 arranged within the feeder curve.

12 Claims, 2 Drawing Sheets

FILLING MACHINE AND METHOD OF FEEDING PASTE MASSES FROM A HOPPER INTO A CONVEYING MECHANISM

CROSS-REFERENCE TO RELATED APPLICATION

The present application claims the benefit of priority of European Patent Application No. 06004279.3 filed on Mar. 2, 2006. The entire text of the priority application is incorporated herein by reference in its entirety.

1. Field of the Disclosure

The disclosure relates to a filling machine and a method of charging paste masses, in particular sausage meat.

2. Background of the Disclosure

The types of filling machine for charging paste mass, in which the paste mass from a hopper is introduced into a conveying mechanism, from where it is ejected into a filling tube in order to fill sausage casings with paste mass, are already known from the state of the art.

Normally, during sausage production filling machines are used, the hoppers of which are open at the top. Here, the sausage meat in the hopper is fed by a circulating feeder curve to the center and to a certain extent downwards to the conveying mechanism, wherein a scraper, which releases the sausage meat from the edge of the hopper, is usually located on the outer side of this feeder curve. In the conveying mechanism a negative pressure is produced by a vacuum pump in order to extract air and thus also oxygen from the sausage meat, so that the shelf life of the sausage is extended. At the same time, a pressure difference $\Delta p$ to the surface of the hopper charge arises in the conveying mechanism due to the negative pressure such that the paste mass is pressed into the conveying mechanism chamber by the atmospheric air pressure.

The evacuation of the sausage meat can only take place to a restricted extent using this method. In order to extract more air and thus oxygen from the sausage meat, closed hoppers are employed, wherein a negative pressure is produced already in the hopper. The problem here is that the differential pressure between the hopper and the conveying mechanism is lower and so the filling of the conveying mechanism chamber deteriorates, leading in turn to inaccuracies in the portion weights. The better the filling mass is evacuated in the hopper, i.e. the lower the pressure in the hopper, then the lower is the pressure difference $\Delta p$ between the hopper and the conveying mechanism, and the worse is the charging of the conveying mechanism chambers. A static pressure, resulting from the weight and depending on the filling level of the hopper, has a supporting effect on the atmospheric differential pressure $\Delta p$ for filling the conveying mechanism.

Thus, with the state of the art there is the disadvantage that with an open hopper the degree of evacuation is only very slight.

With a closed hopper, on which the degree of evacuation has been improved, a lower proportion of residual air in the product can be achieved (wherein $\Delta p$ is small, e.g. 30 mbar, that is, for example, in the hopper 50 mbar, in the conveying mechanism 20 mbar). However, the conveying mechanism can only be filled inadequately, producing a poor weight accuracy of the products, because due to the lack of differential pressure no complete charging of the conveying mechanism with paste mass is possible. This problem exists irrespective of the principle of the conveying mechanism (reciprocating, sliding-vane or screw conveying mechanism, etc.) and occurs in particular with solid masses. In order to achieve a sufficiently high conveying throughput from the hopper into the conveying mechanism with the low differential pressure $\Delta p$, large entry cross-sections are needed in the conveying mechanism. However, then one of the problems is that on running the machine until it is empty large residues are still left in the machine, because no sausage meat enters the conveying mechanism once a connecting channel is created in the sausage meat between the hopper and conveying mechanism and thus a pressure balance can arise between the two containers. Overall only relatively small conveyed quantities are possible.

If the pressure difference $\Delta p$ between the hopper and the conveying mechanism is chosen higher, e.g. 80 mbar (e.g. pressure in the hopper 100 mbar and in the conveying mechanism 20 mbar), the charging of the conveying mechanism with mass can take place more easily, i.e. a better weight accuracy of the end product is produced; however a worse evacuation of the mass, i.e. a higher proportion of residual air in the product results.

The pressure difference $\Delta p$ should be of an order of magnitude such that it facilitates an optimum evacuation of the mass and at the same time presses the mass into the conveying mechanism. Due to the principle used here, none of the two tasks can be optimally fulfilled.

Starting from this, the object of the invention is to provide a filling machine and a method of filling a paste mass, which facilitates filling the conveying mechanism continuously and completely with mass, irrespective of the degree of evacuation and filling level of the paste mass.

SUMMARY OF THE DISCLOSURE

The disclosure facilitates the reliable charging of the conveying mechanism with sausage meat irrespective of the degree of evacuation and the filling level of the paste mass in the hopper. Due to the combination according to the disclosure of a feeder curve and screw conveyor arranged within the feeder curve, the paste mass can be transported into the conveying mechanism even when the pressure difference $\Delta p$ between the conveying mechanism and hopper is low. The conveying effect occurs furthermore irrespective of the filling level and thus also irrespective of the static pressure. The combination according to the disclosure of the feeder curve and screw conveyor is possible both with an open as well as with a closed hopper. According to the disclosure complete charging of the conveying mechanism chamber and thus a high portioning accuracy at the outlet of the conveying mechanism is achieved. Due to the complete charging of the conveying mechanism, continuous portioning by the conveying mechanism with a constant filling flow is also possible. The conveyed quantity can be increased.

Advantageously, the screw conveyor is arranged centrally with respect to the axis of the feeder curve.

According to a preferred embodiment the feeder curve at the edge of the hopper is arranged as a helix open on the inside and it conveys the paste mass essentially to the middle of the hopper. In contrast, the screw conveyor conveys the mass in the direction of the conveying mechanism and mechanically presses the filling mass into the conveying mechanism chamber.

According to a preferred embodiment the feeder curve and screw conveyor comprise their own drive. Thus, different speeds for the feeder curve and the screw conveyor can be selected. This drive can be realized by appropriate motors. The drive of the feeder curve and the screw conveyor can also be realized with mechanical coupling and thus using only one motor, wherein the coupling of the two conveyance devices can then be realized in a fixed, but also in a variable speed relationship.

It is possible for the feeder curve to be rotationally supported in the lower end section of the hopper and for the screw conveyor to be rotationally supported in the upper end section of the hopper. A construction of this nature has the advantage that sufficient space for the various drives and bearings is provided. Since the bearing for the screw conveyor is arranged at the upper end of the hopper, the screw conveyor can protrude freely with its lower end into the hopper outlet and it thus does not impede the transport of the paste mass through the outlet. The support and drive for the screw conveyor could also for example take place from below, parallel to the drive of the feeder curve.

Furthermore, the filling machine can comprise a control device, through which the rotational speed of the screw conveyor and the rotational speed of the feeder curve can be closed-loop controlled dependently or independently from one another.

The closed-loop rotational speed control of the screw conveyor and/or of the feeder curve can for example depend on at least one of the following parameters:

Pressure in the closed hopper, pressure in the region of the screw conveyor or in the inlet region of the conveying mechanism, pressure in the conveying mechanism or its outlet region, temperature and the type of mass, air content of the mass, conveying throughput of the conveying mechanism, etc.

Preferably the screw conveyor rotates faster than the feeder curve. The screw conveyor can rotate substantially faster than the feeder curve, because the outer diameter is substantially smaller than the largest diameter of the feeder curve. Thus, "over-conveying" which might be detrimental to the mass can be largely prevented.

BRIEF DESCRIPTION OF DRAWINGS

The disclosure is explained in more detail in the following with reference to the following figures.

DETAILED DESCRIPTION OF THE DISCLOSURE

Figure 1:
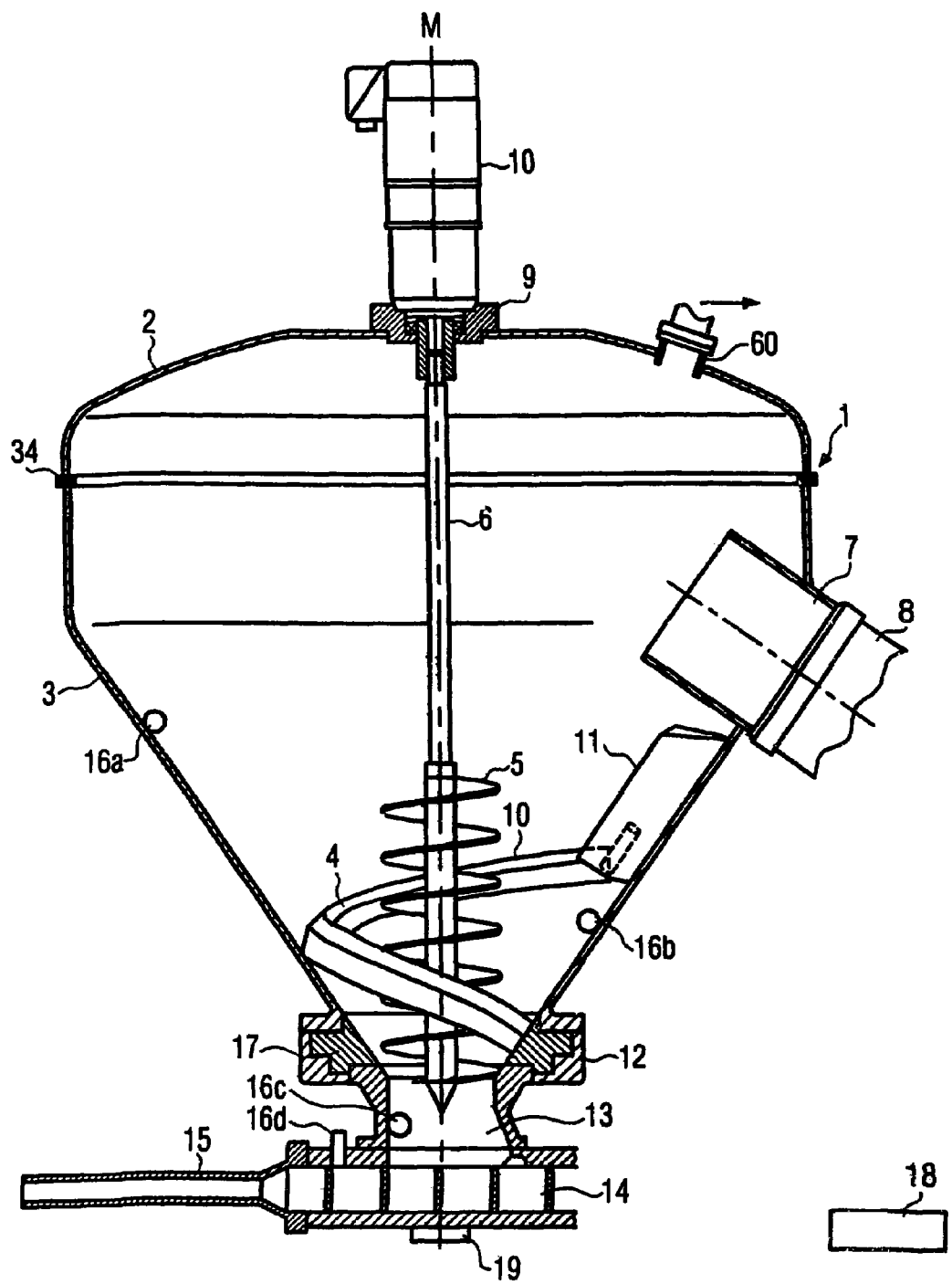
FIG. 1 shows a schematic longitudinal section through a filling machine according to the invention.

FIG. 1 shows an embodiment of a filling machine according to the disclosure. The filling machine according to the disclosure comprises a hopper 1, preferably a vacuum hopper 1, which comprises a lid 2 and a hopper section 3 which runs at least partly conically. The hopper section 3 and the lid 2 are connected together vacuum-tight via a seal 34, e.g, a sealing ring. The hopper 1 is in this embodiment a vacuum hopper in which a negative pressure can be produced. The vacuum hopper 1 comprises an inlet 7 for feeding a paste mass from a reservoir which is not illustrated via the feed tube 8. The hopper 1 also comprises at the lower end, i.e. at the end opposite the lid 2, an outlet region 13 for the paste mass. At the outlet region 13, a conveying mechanism 14 is arranged which conveys the paste mass from the hopper 1 into a filling tube 15. A vacuum pump 19, which is only illustrated schematically, is used to produce a negative pressure in the conveying mechanism or in the conveying mechanism chambers and, via a separate vacuum connection 60, in the hopper 1. Then in the known manner, the paste mass, such as for example the sausage meat, is pushed via the filling tube 15 into the sausage casings provided.

An appropriate feed device 4, 5 is provided to convey the paste mass from the hopper 1 into the conveying mechanism 14. According to the disclosure the feed device comprises a combination of a feeder curve 4 and a screw conveyor 5 arranged within the feeder curve.

The helix-shaped feeder curve 4 is formed as a screw open on the inside. It runs about a feeder curve axis which corresponds preferably to the central axis M of the vacuum hopper 1. To achieve this, the feeder curve 4 is supported for rotation in an appropriate bearing 12 in the lower end section of the hopper 1 and is driven by an appropriate drive 17, which here for example is arranged behind the bearing 12 and cannot be seen. The feeder curve 4 is arranged at the edge of the hopper and preferably exhibits a short distance from the edge of the hopper. The feeder curve thus exhibits a diameter which increases from the bottom to the top, i.e. from the lower end region 13 in the direction of the lid 2. The cross-section of the feeder curve 4 can exhibit an indentation (V or U-shaped), which is essentially aligned to the central axis M. On the outer side of the feeder curve 4 there is a scraper 11, which releases the paste mass from the edge of the hopper. The scraper 11 moves according to the circulating movement of the feeder curve along the hopper wall. Due to the circulating movement of the feeder curve 4, the paste mass in the hopper 1 is conveyed essentially to the centre of the hopper. To a limited extent the paste mass is also conveyed downwards in the direction of the outlet region 13.

The screw conveyor 5 is provided within the feeder curve 4. The screw conveyor 5 is here rotationally supported in the bearing 9 through the shaft 6 in the upper region of the vacuum hopper, e.g. here in the lid 2. Using the drive 10, the screw conveyor 5 can be rotated about the screw conveyor axis, which preferably corresponds to the longitudinal axis M of the hopper. The drive is provided by the motor 10. The screw conveyor 5 extends through the feeder curve 4. The screw conveyor 5 transports the paste mass in the direction of the conveying mechanism 14 and, through a mechanically produced $\Delta p$, presses the filling mass into the conveying mechanism chambers of the conveying mechanism 14. In this embodiment the screw conveyor extends through into the outlet region 13. The spacing between the conveying mechanism 14 and the end of the screw conveyor is preferably smaller than the spacing between the conveying mechanism and the end of the feeder curve. The outer diameter of the screw conveyor 5 is smaller than the largest diameter of the feeder curve 4. The pitch of the screw conveyor can be uniform, progressive or degressive. The geometry of the envelope curve of the screw conveyor can be cylindrical or conical or take on any other shape.

Through the combination of the screw conveyor 5 and the feeder curve 4, a conveying effect of the paste mass is produced irrespective of the filling level and irrespective of the differential pressure between the hopper 1 and the conveying mechanism 14. Thus complete charging of the conveying mechanism chambers and hence a high portioning accuracy can be achieved at the outlet of the conveying mechanism 14.

The respective drives or respective motors 17 and 10 for the feeder curve 4 and the screw conveyor 5 are controlled via a control device 18. Here, the rotational speed of the screw conveyor 5 and the rotational speed of the feeder curve 4 can be closed-loop controlled dependently or independently of one another in a fixed or variable speed relationship. The drive of the feeder curve and the screw conveyor can also be realized with mechanical coupling and thus using one motor, wherein then the coupling of the two conveyance devices can be realized in a fixed, but also in a variable speed relationship.

The control device 18 also controls the conveying mechanism 14, i.e. for example its conveying throughput.

The screw conveyor 5 can rotate substantially faster than the feeder curve 4, because the outer diameter is substantially smaller than the largest diameter of the feeder curve 4. Thus, over-conveying which might be of detriment to the mass can be largely prevented. Due to the complete charging of the conveying mechanism, continuous portioning by the conveying mechanism with a constant filling flow is also possible.

The closed-loop rotational speed control of the screw conveyor 5 and/or feeder curve 4 can take place independently, but preferably dependent on various parameters. The closed-loop control occurs for example in dependence of at least one of the following parameters:

Pressure in the closed hopper, pressure in the region of the screw conveyor or in the inlet region of the conveying mechanism 14, pressure in the conveying mechanism or its outlet region, temperature and the type of mass, air content of the mass, etc.

Figure 2:
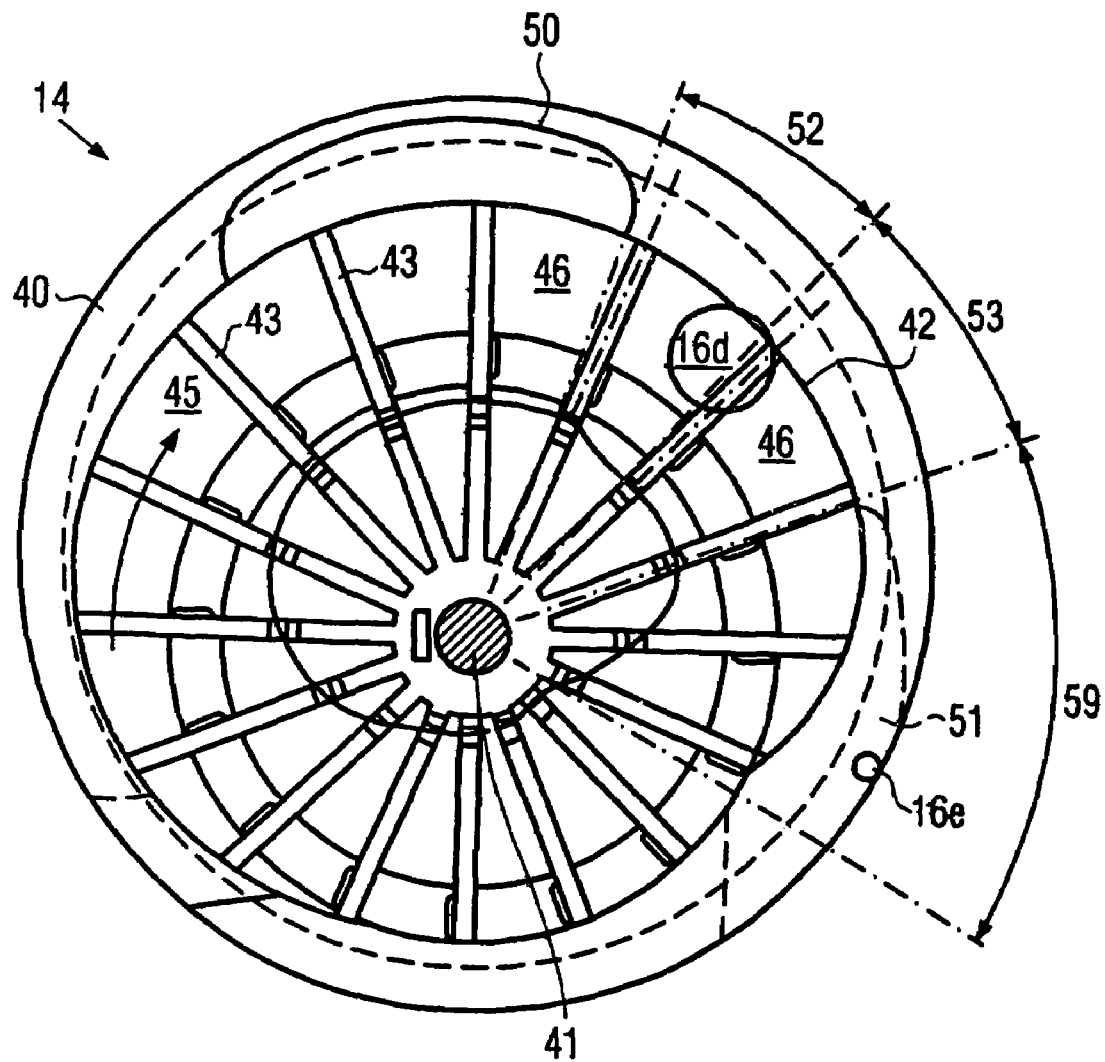
FIG. 2 shows schematically a cross-section of a conveying mechanism.

To measure the pressure appropriate pressure sensors 16a can be alternatively provided in the hopper and/or 16b in the region of the screw conveyor, 16c in the inlet region of the conveying mechanism 14 or 16d and 16e respectively in the conveying mechanism 14 or its outlet region (see also FIG. 2). A device for the measurement of the compressibility can be provided to determine the air content. The various parameters can either be passed to the controller 18 via the appropriate pressure, temperature, level or compressibility transducers or however entered via an appropriate keyboard which is connected to the controller 18.

FIG. 2 shows an example of a conveying mechanism 14 in the shape of a vane pump which, for example, is also described in EP 1040758 B1. As can be seen from FIG. 2, the vane pump consists of a pump housing 40 and a rotor arranged eccentrically in it, and being rotatable with a pump shaft 41. In the rotor, vanes 43, supported for radial movement, are arranged, which with the wall 42 of the pump housing 40, the base 45 and the lid of the housing (not illustrated) and the outer surface of the rotor 41 form conveying cells. The pump housing 40 exhibits a sausage meat inlet 50 and a sausage meat outlet 51. The inlet 50 is connected to the outlet region 13 of the vacuum hopper 1. Furthermore a vacuum pump 19, illustrated schematically in FIG. 1, is also provided which produces a negative pressure in the conveying mechanism 14 to extract air from the paste mass. The negative pressure is also produced in the vacuum hopper with this vacuum pump 19 via a separate vacuum pipe.

The combination and pitch of the feeder curve 4 and the screw conveyor 5 are such that their axes rotate in the same direction. However, a counter-rotating movement is also possible. Depending on the two rotating devices one to the other, the rotational speeds of these two conveying devices have a certain ratio to one another.

Also the conveying throughput, i.e. the rotational speed of the conveying mechanism 14, is controlled via the controller 18.

In a method of charging paste mass, in particular sausage meat, the paste mass is fed from a reservoir via the feed tube to the inlet 7 of the vacuum hopper 1. The circulating feeder curve 4 is rotated about the feeder curve axis M by the drive 17. The circulating feeder curve 4 conveys the paste mass essentially to the center of the hopper. At the same time, the screw conveyor 5 is rotated by the drive 10 in the same direction or in the opposite direction to the feeder curve 4 about the screw conveyor axis, here the central axis M. The screw conveyor 5 here transports the mass downwards in the direction of the conveying mechanism 14 and mechanically presses the paste mass into the conveying mechanism chambers, for example in the region of the sausage meat inlet 50 into the conveying cells 46 of the vane pump illustrated in FIG. 2. The control of the drives for the feeder curve and the screw conveyor is provided by the control device 18. Thus, complete charging of the conveying mechanism chambers and a high portioning accuracy at the outlet of the conveying mechanism are achieved. The conveying mechanism then conveys the paste mass into the filling tube 15, which fills the paste mass into sausage casings in the known manner.

With the method according to the invention the screw conveyor can rotate substantially faster than the feeder curve 4, because the outer diameter of the screw conveyor is substantially smaller than the largest diameter of the feeder curve. Thus, over-conveying which might be detrimental to the mass can be largely prevented. Due to the complete charging of the conveying mechanism, continuous portioning out of the conveying mechanism with a constant filling flow is possible.

Due to the combination of features of the feeder curve and screw conveyor according to the disclosure, it is possible to charge the conveying mechanism 14 from a hopper, in particular an evacuated vacuum hopper, continuously and completely with paste mass, irrespective of the degree of evacuation and the filling level of the paste mass. The conveyor throughput can thus be increased.

The disclosure has been described here in conjunction with a vacuum hopper 1. The combination of features of the feeder curve and screw conveyor according to the disclosure is however also possible in conjunction with an open hopper.

In the embodiment illustrated in FIG. 1 the support and drive of the screw conveyor 5 occurs in the upper region, i.e. here in the lid 2, of the filling machine. The disclosure is however not restricted to this. The support and drive for the screw conveyor 5 could also for example take place from below, i.e. parallel to the drive of the feeder curve.

I claim:

1. Filling machine for charging paste mass, in particular sausage meat, comprising:
   a hopper,
   a conveying mechanism arranged below the hopper, and
   a feed device for feeding the paste mass from the hopper into the conveying mechanism,
   the feed device having a feeder curve, and
   a screw conveyor arranged within the feeder curve, wherein the feeder curve is rotationally supported in the lower end region of the hopper and the screw conveyor is rotationally supported in one of the upper or lower end region of the hopper.

2. Filling machine according to claim 1, wherein the screw conveyor is arranged centrally to the axis of the feeder curve.

3. Filling machine according to claim 1, wherein the feeder curve at the edge of the hopper is arranged as a helix, open on the inside, and the paste mass is essentially conveyed to the center of the hopper, wherein the screw conveyor is formed such that it conveys the paste mass downwards to the conveying mechanism.

4. Filling machine according to claim 1, wherein the feeder curve and the screw conveyor each comprise their own drive.

5. Filling machine according to claim 1, and wherein the filling machine also comprises a control device through which the rotational speed of the screw conveyor and the rotational speed of the feeder curve can be closed-loop controlled one of dependently or independent of one another.

6. Filling machine according to claim 5, wherein the closed-loop rotational speed control of at least one of the screw conveyor or the feeder curve is controlled dependent on at least one parameter from the following group:

pressure in the closed hopper, pressure in the region of one of the screw conveyor or in the inlet region of the conveying mechanism, pressure in one of the conveying mechanism or its outlet region, temperature and the type of mass, air content of the mass, conveying throughput of the conveying mechanism.

7. Filling machine according to claim 1, wherein the hopper is a closed vacuum hopper.

8. Method of charging paste mass, comprising:

feeding of paste mass from a hopper into a conveying mechanism, which conveys the paste mass into a filling tube for filling sausages, wherein feeding of the paste mass from the hopper to the conveying mechanism utilizes the combined effect of a feeder curve and a screw conveyor arranged within the feeder curve, wherein the feeder curve is rotationally supported in the lower end region of the hopper and the screw conveyor is rotationally supported in one of the upper or lower end region of the hopper.

9. Method according to claim 8, and conveying the paste mass by the feeder curve essentially to the center of the hopper, and conveying the paste mass by the screw conveyor downwards to the conveying mechanism.

10. Method according to claim 8, and closed-loop controlling of the rotational speed of the screw conveyor and the rotational speed of the feeder curve one of dependently or independent of one another.

11. Method according to claim 10, wherein the closed-loop rotational speed controlling of the screw conveyor and the feeder curve is controlled dependent on at least one parameter from the following group:

pressure in the closed hopper, pressure in the region of one of the screw conveyor or in the inlet region of the conveying mechanism, pressure in one of the conveying mechanism or its outlet region, temperature and the type of mass, air content of the mass, conveying throughput of the conveying mechanism.

12. Method according to claim 8, and rotating the screw conveyor at a higher speed than the feeder curve.

* * * * *

UNITED STATES PATENT AND TRADEMARK OFFICE
CERTIFICATE OF CORRECTION

PATENT NO. : 7,500,909 B2  Page 1 of 1
APPLICATION NO. : 11/709554
DATED : March 10, 2009
INVENTOR(S) : Bernd Maile It is certified that error appears in the above-identified patent and that said Letters Patent is hereby corrected as shown below:

On the Title Page:

At Item (30), "06004279" should be -- 06004279.3 --.

Signed and Sealed this

Twenty-first Day of July, 2009

JOHN DOLL
*Acting Director of the United States Patent and Trademark Office*